United States Patent [19]

Asai

[11] 4,205,448
[45] Jun. 3, 1980

[54] TAPE MEASURE

[75] Inventor: Motoyoshi Asai, Kyotoshi, Japan

[73] Assignee: Kyoto Measuring Instruments Corporation, Japan

[21] Appl. No.: 911,932

[22] Filed: Jun. 2, 1978

[30] Foreign Application Priority Data

Jun. 23, 1977 [JP] Japan ................ 52/81808[U]

[51] Int. Cl.² ................ G01B 3/10; B65H 75/16
[52] U.S. Cl. ................ 33/138; 242/84.8
[58] Field of Search ................ 33/138; 242/84.8

[56] References Cited

U.S. PATENT DOCUMENTS 3,816,925  6/1974  Hogan et al. ................ 33/138

FOREIGN PATENT DOCUMENTS 2100307  7/1972  Fed. Rep. of Germany ............ 33/138
1192683  5/1970  United Kingdom ................ 242/84.8

Primary Examiner—Steven L. Stephan
Attorney, Agent, or Firm—Whittemore, Hulbert & Belknap

[57] ABSTRACT

A tape measure equipped with a stopper which stops a rule when the rule drawn into a case by an elastic force is pulled out from the case is disclosed. In this tape measure, by a button-pushing operation, a pressing piece of the stopper is caused to slide in the direction vertical to the rule, and the pressing piece is held and maintained in the state where the pressing piece has pressing contact with the rule or in the state where the pressing piece is separated from the rule.

6 Claims, 2 Drawing Figures

TAPE MEASURE

BACKGROUND OF THE INVENTION

A tape measure equipped with a stopper which stops a rule when the rule drawn into a case by an elastic force is pulled out from the case is known. In known tape measures of this type, a pressing piece for stopping the rule is pressed to the rule by a pushed button according to the principle of the lever, or a pressing piece for stopping the rule is pressed to and contacted with the rule vertically thereto. In the former tape measures, the top end of the pressing piece is caused to have inclined contact with the rule and therefore, the pressing force of the pressing piece cannot be transmitted to the rule at high efficiency. Moreover, it is impossible to operate the pressing piece lightly and smoothly unless the precision is enhanced in the intermediate connecting portion between the button and pressing piece where a lever relation is established. In the latter tape measures, even if the pressing piece is caused to fall in pressing contact with the rule by the button-pushing operation, when the finger is separated from the button, the pressing force of the pressing piece against the rule is immediately released and the rule is drawn into the case. Further, since the button-pressing force is directly transmitted to the rule through the pressing piece, an unnecessarily large pressing force is applied to the rule.

SUMMARY OF THE INVENTION

The present invention relates to a stopper-equipped tape measure in which the foregoing defects involved in the conventional tape measures are eliminated. More particularly, the present invention provides a tape measure equipped with a stopper for stopping a rule, in which by a button-pushing operation, a pressing piece of the stopper is held and maintained in the state where the pressing contact with the rule or in the state where the pressing piece is separated from the rule, and in which the pressing piece is allowed to slide in the direction vertical to the rule and is brought into pressing contact with the rule, whereby the elasticity possessed by the pressing piece can be effectively transmitted to the rule and an unnecessarily large pressing force is not applied to the rule.

Further, in the stopper-equipped tape measure of the present invention, a seesaw-type push button is formed integrally with a cam piece so that the cam piece pushes the pressing piece toward the rule. Accordingly, the number of members constituting the stopping mechanism can be remarkably reduced.

Moreover, since the cam piece acts so that the pressing piece is linearly push toward the rule, even if the respective members are not processed at a high precision, they can be operated sufficiently and smoothly.

BRIEF DESCRIPTION OF THE DRAWING

The drawing illustrates one embodiment of the tape measure of the present invention, in which.

DETAILED DESCRIPTION OF THE PREFERRED EMBODIMENT

Figure 1:
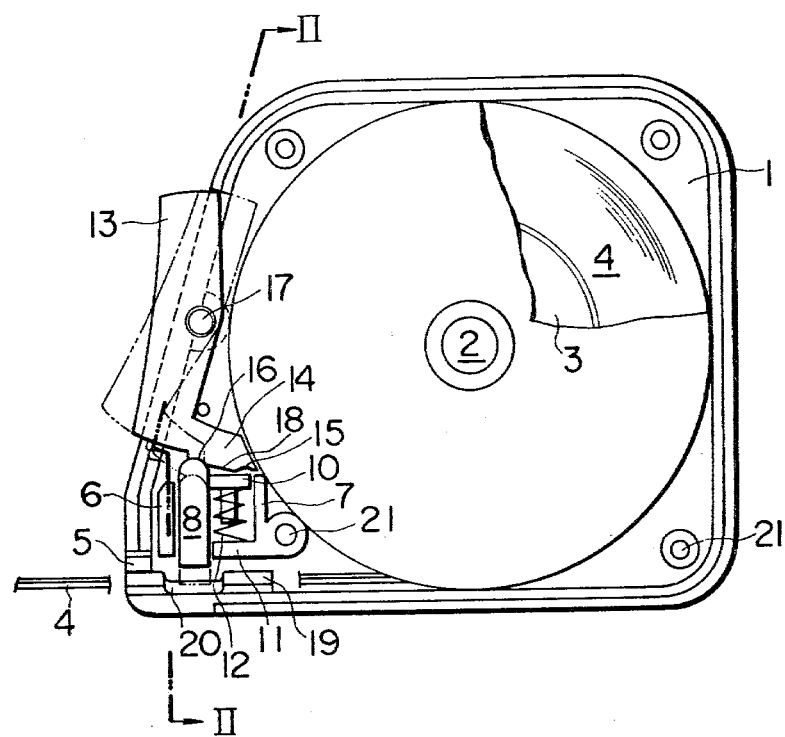
FIG. 1 is a front view of the tape measure in the state where a case lid is taken away and FIG. 2 is a view showing the section taken along the line II—II of FIG. 1 and illustrating the tape measure in the state where the case lid is attached.
Figure 2:
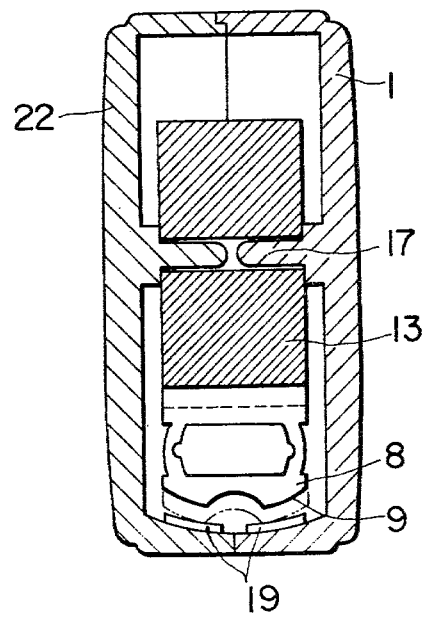

One embodiment of the tape measure of the present invention will now be described in detail by reference to the accompanying drawing.

Referring to the drawing, reference numeral 1 represents a case body, and a rule 4 is drawn into the case 1 by a spring 3 wound on a shaft 2 located in the central portion of the case 1. The rule 4 is wound around the periphery of the spring 3, and it is taken out from the interior of the case body 1 by pulling out the end of the rule 4 from a taken-out opening 5. Two confronting guide pieces 6 and 7 are disposed in the interior of the take-out opening and a pressing piece 8 is slidably supported between the guide pieces 6 and 7. It is preferred that the pressing piece 8 be disposed so that it falls in contact with the rule 4 in the vicinity of the take-out opening 5 vertically to the rule 4. The pressing piece 8 consists of a rod-like elastic flat plate having a hole piercing through the center thereof, and an arcuate face 9 conforming substantially to the sectional shape of the rule 4 is formed on the lower end edge of the plate of the pressing piece 8. A spring supporting piece 10 is formed on the top end of the pressing piece 8, and a spring 12 is supported between this spring supporting piece 10 and a spring receiving piece 11 formed in the lower end of the guide piece 7 so that the pressing piece 8 is always urged in a direction separating from the rule 4. A seesaw-type push button 13 having the central portion pivoted on the case body 1 is disposed above the pressing piece 8. A L-shaped cam piece 14 is projected from the lower end of the seesaw-type push button 13, and dents 15 and 16 are formed on the top end and center of the cam piece 14 so that the head portion of the pressing piece 8 is fitted in said dents 15 and 16. The distance between the dent 15 and the fulcrum 17 of the seesaw-type push button 13 is made larger than the distance between the dent 16 and the fulcrum 17 of the seesaw-type push button 13, and a cam face 18 is formed along the peripheral edge of the cam piece 14 between the dent 15 and dent 16. A rule guide 19 is disposed on the inside of the take-out opening 5, and a dent 20 is formed in the central portion of the rule guide 19. A screw hole 21 is formed to attach a lid 22 to the case body 1.

When the rule 4 is taken out from the case body 1, the lower end of the seesaw-type push button 13 is depressed into the case body 1. At this point, by the elastic force of the spring 12, the pressing piece 8 is caused to rise along the guide pieces 6 and 7. As a result, the top end of the pressing piece 8 falls in engagement with the dent 16 of the cam piece 14 and the lower end of the pressing piece 8 is separated from the rule 4. Thus, it becomes possible to freely take out the rule from the interior of the case body 1. When it is desired to fix the rule 4 in the state where the rule 4 is taken out along a certain length, the top end of the seesaw-type push button 13 is pushed into the case body 1 and the cam piece 14 is turned in the clockwise direction. At this point, the head portion of the pressing piece 8 is brought down against the elastic force of the spring 12 by the cam face 18, and the head portion of the pressing piece 8 is caused to fall in engagement with the dent 15. At this point, the arcuate face 9 on the lower end of the pressing piece 8 is projected toward the dent 20 of the rule guide 19, whereby the rule 4 is tightly pressed to the rule guide 19 by the lower end of the pressing piece 8 and the rule 4 is prevented from moving and is fixed. When the pressing piece 8 thus presses the rule 4, both the side face portions of the pressing piece 8 are curved, and the rule 4 is strongly pressed by an elastic force caused by this curving deformation.

As will be apparent from the foregoing illustration, in the tape measure of the present invention, by using the seesaw-type push button, the pressing piece is pressed or the pressing on the pressing piece is released, so that the pressing piece is caused to fall in pressing contact with the rule or this pressing contact is released, and since the pressing state can be held and maintained fixedly when the pressing piece is pressed to have pressing contact with the rule, the rule is prevented from being drawn into the case body even if the finger is separated from the push button while the rule is taken out from the case body. Therefore, the use of the tape measure can be remarkably facilitated.

Further, since the pressing piece is composed of a frame-like elastic plate, even if it is strongly pressed to the rule by the seesaw-type push button, both the side portions of the elastic plate are appropriately deformed and therefore, the rule can be strongly and tightly stopped and fixed without damaging the rule.

What is claimed is:

1. A tape measure comprising a casing having a side face and a rule take-out opening, a rule wound and contained in the case and adapted to be withdrawn through the rule take-out opening an elastic pressing piece having a head, bottom and side portions forming a frame-like structure about a generally rectangular opening which side portions are arcuate and extend generally perpendicularly to the rule adjacent the take-out opening whereby said side portions flex on movement of the pressing piece into engagement with the rule disposed in the case in the vicinity of the rule take-out opening, push button means extending through the side face of the case adjacent the rule take-out opening engageable with the pressing piece for moving the pressing piece into engagement with the rule in the vicinity of the take-out opening, and rule guide means carried by the case positioned on the other side of the rule in the vicinity of the take-out opening against which the rule is resiliently held by the pressing piece in engagement with the rule.

2. Structure as set forth in claim 1, wherein the pressing piece further includes arcuate recesses in each of the side portions thereof substantially centrally thereof to provide a central pivot point for the flexing of the sides of the pressing piece.

3. Structure as set forth in claim 1, wherein the rule guide means is arcuate and the bottom of the pressing piece is arcuate and complementary to the rule guide means whereby the rule is firmly engaged between the pressing piece and rule guide means on movement of the pressing piece toward the rule guide means.

4. Structure as set forth in claim 1, and further including a recess in the rule guide means immediately beneath the pressing piece into which the rule is resiliently deflected on movement of the pressing piece toward the rule guide means.

5. Structure as set forth in claim 1, and further including spring return means for moving the pressing piece away from the rule guide means.

6. Structure as set forth in claim 1, wherein the push button means for moving the pressing piece toward the rule guide means comprises an L-shaped member having a longer and a shorter portion, the longer portion of which extends through the side face of the case and the shorter portion of which extends into the case above and in engagement with the pressing piece, said L-shaped member being pivotally mounted to the case centrally of the longer portion thereof, the shorter portion of the L-shaped member being arcuate on its bottom surface in engagement with the pressing member and having a pair of spaced apart detent recesses therein whereby on pivoting of the L-shaped member about the pivotal mounting thereof the pressing member may be engaged in the respective detent recesses and moved toward and allowed to move away from the rule guide.

* * * * *